United States Patent
Nishi et al.

(10) Patent No.: US 10,721,497 B2
(45) Date of Patent: Jul. 21, 2020

(54) VIDEO RECEPTION METHOD, VIDEO TRANSMISSION METHOD, VIDEO RECEPTION APPARATUS, AND VIDEO TRANSMISSION APPARATUS

(71) Applicant: Panasonic Intellectual Property Management Co., Ltd., Osaka (JP)

(72) Inventors: Takahiro Nishi, Nara (JP); Tadamasa Toma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 168 days.

(21) Appl. No.: 15/913,172

(22) Filed: Mar. 6, 2018

(65) Prior Publication Data

US 2018/0199073 A1    Jul. 12, 2018

Related U.S. Application Data

(63) Continuation of application No. PCT/JP2016/003946, filed on Aug. 30, 2016.
(Continued)

(30) Foreign Application Priority Data

May 20, 2016 (JP) .................................. 2016-101957

(51) Int. Cl.
*H04N 19/98* (2014.01)
*H04N 21/434* (2011.01)
(Continued)

(52) U.S. Cl.
CPC ........... *H04N 19/98* (2014.11); *H04N 19/136* (2014.11); *H04N 19/44* (2014.11); *H04N 19/46* (2014.11);
(Continued)

(58) Field of Classification Search
CPC combination set(s) only.
See application file for complete search history.

(56) References Cited

U.S. PATENT DOCUMENTS

| 10,219,007 B2 * | 2/2019 | Francois | ................ | H04N 19/70 |
| 2006/0056705 A1 * | 3/2006 | Kadono | ................ | H04N 19/70 |
| | | | | 382/232 |

(Continued)

FOREIGN PATENT DOCUMENTS

| CA | 2 936 313 | 7/2015 |
| WO | 2015/111467 | 7/2015 |

OTHER PUBLICATIONS

Extended European Search Report dated Jun. 26, 2018 in corresponding European Patent Application No. 16843914.9.
(Continued)

*Primary Examiner* — Janese Duley
(74) *Attorney, Agent, or Firm* — Wenderoth, Lind & Ponack, L.L.P.

(57) ABSTRACT

Provided is a video reception method performed by a video reception apparatus including a display. The video reception method includes: receiving a reception signal multiplexed from video data and audio data; outputting, as first transfer characteristics information, transfer characteristics obtained by demultiplexing the reception signal; outputting, as second transfer characteristics information, transfer characteristics obtained by decoding the video data, the second transfer characteristics information being information for specifying, at frame accuracy, a transfer function corresponding to a luminance dynamic range of the video data; and displaying the video data while controlling a luminance dynamic range of the display at frame accuracy according to the second transfer characteristics information.

10 Claims, 10 Drawing Sheets

Related U.S. Application Data

(60) Provisional application No. 62/217,431, filed on Sep. 11, 2015.

(51) Int. Cl.
| | | |
|---|---|---|
| *H04N 19/895* | (2014.01) | |
| *H04N 21/431* | (2011.01) | |
| *H04N 21/845* | (2011.01) | |
| *H04N 21/2362* | (2011.01) | |
| *H04N 21/236* | (2011.01) | |
| *H04N 19/136* | (2014.01) | |
| *H04N 19/44* | (2014.01) | |
| *H04N 19/46* | (2014.01) | |

(52) U.S. Cl.
CPC ....... *H04N 19/895* (2014.11); *H04N 21/2362* (2013.01); *H04N 21/23614* (2013.01); *H04N 21/431* (2013.01); *H04N 21/434* (2013.01); *H04N 21/4345* (2013.01); *H04N 21/4348* (2013.01); *H04N 21/845* (2013.01)

(56) References Cited

U.S. PATENT DOCUMENTS

| | | | |
|---|---|---|---|
| 2015/0103919 A1* | 4/2015 | Hattori | H04N 19/124 |
| | | | 375/240.25 |
| 2015/0110167 A1 | 4/2015 | Chen et al. | |
| 2016/0309201 A1 | 10/2016 | Tsukagoshi | |
| 2017/0347113 A1* | 11/2017 | De Haan | H04N 1/64 |

OTHER PUBLICATIONS

International Search Report (ISR) dated Oct. 18, 2016 in International (PCT) Application No. PCT/JP2016/003946.
ARIB Standard, ARIB STD-B67, Version 1.0, Jul. 3, 2015.

* cited by examiner

VIDEO RECEPTION METHOD, VIDEO TRANSMISSION METHOD, VIDEO RECEPTION APPARATUS, AND VIDEO TRANSMISSION APPARATUS

CROSS REFERENCE TO RELATED APPLICATIONS

This application is a U.S. continuation application of PCT International Patent Application Number PCT/JP2016/003946 filed on Aug. 30, 2016, claiming the benefit of priority of U.S. Provisional Patent Application No. 62/217,431 filed on Sep. 11, 2015 and Japanese Patent Application Number 2016-101957 filed on May 20, 2016, the entire contents of which are hereby incorporated by reference.

BACKGROUND

1. Technical Field

The present disclosure relates to a video reception method, a video transmission method, a video reception apparatus, and a video transmission apparatus.

2. Description of the Related Art

The high dynamic range (HDR) has been drawing attention as a scheme covering a luminance range with an increased maximum luminance value in order to represent bright light such as mirror-reflected light that cannot be represented using current TV signals, with brightness closer to the actual brightness while maintaining dark grayscale values of existing video. Specifically, the scheme covering the luminance range supported by the existing TV signals is called the standard dynamic range (SDR) and has the maximum luminance value of 100 nits. In contrast, the HDR is expected to have an increased maximum luminance value of at least 1000 nits (see ARIB STANDARD ARIB STD-B67 Version 1.0 Jul. 3, 2015 (Non-Patent Literature (NPL) 1)).

SUMMARY

In transmission or reception of video signals supporting a plurality of luminance dynamic ranges as described above, it is desired that a reception apparatus be capable of displaying more appropriate video.

In view of this, an aspect of the present disclosure provides a video reception method, a video transmission method, a video reception apparatus, or a video transmission apparatus capable of displaying appropriate video when transmitting or receiving a video signal supporting a plurality of luminance dynamic ranges.

A video reception method according to an aspect of the present disclosure is a video reception method performed by a video reception apparatus including a display. The video reception method includes: receiving a reception signal including video data and transfer characteristics information, the transfer characteristics information being information for specifying, at frame accuracy, a transfer function corresponding to a luminance dynamic range of the video data; and displaying the video data while controlling a luminance dynamic range of the display at frame accuracy according to the transfer characteristics information.

A video transmission method according to an aspect of the present disclosure includes: generating a transmission signal including video data and transfer characteristics information, the transfer characteristics information being information for specifying, at frame accuracy, a transfer function corresponding to a luminance dynamic range of the video data; and transmitting the transmission signal.

Note that these general or specific aspects may be implemented by a system, a method, an integrated circuit, a computer program, or a computer-readable recording medium such as a compact disc read only memory (CD-ROM), or by any combination of a system, a method, an integrated circuit, a computer program, and a recording medium.

The present disclosure provides a video reception method, a video transmission method, a video reception apparatus, or a video transmission apparatus capable of displaying appropriate video when transmitting or receiving a video signal supporting a plurality of luminance dynamic ranges.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
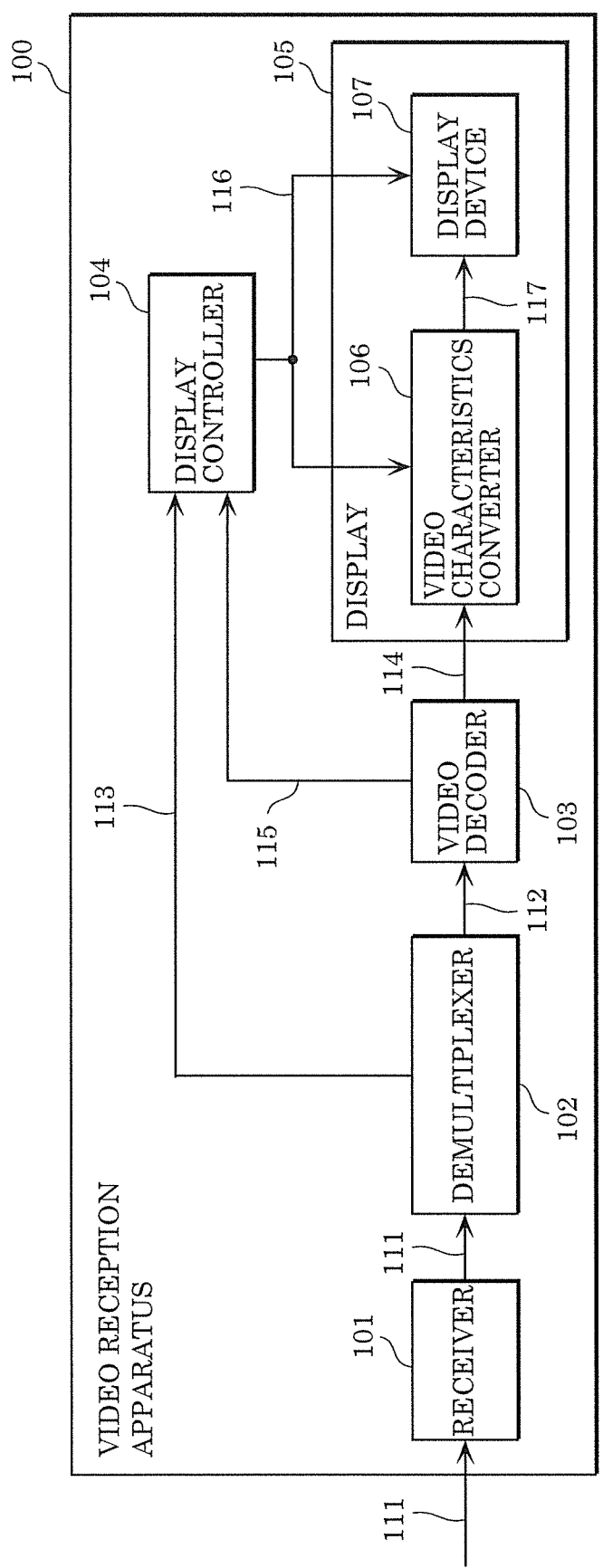
FIG. 1 is a block diagram of a video reception apparatus according to Embodiment 1.

DETAILED DESCRIPTION OF THE EMBODIMENTS (Underlying Knowledge Forming Basis of the Present Disclosure)

According to, for example, a video coding standard known as ITU-T H.265|ISO/IEC 23008-2 HEVC, the optical-electro transfer function (OETF) or electro-optical transfer function (EOTF) of a video signal is notified of using a syntax known as transfer characteristics in video usability information (VUI) included in a sequence parameter set (SPS). Use of the transfer characteristics in the SPS enables notification of switching of transfer characteristics (transfer function) at frame accuracy. A video reception apparatus determines a method of controlling a video display, based on the transfer characteristics.

According to the MPEG-2 transport stream (TS) standard, which is used for transmitting a video signal and an audio signal in a multiplexed manner as in the case of TV broadcast etc., there is a known method of including, in a descriptor of program-specific information (PSI), a parameter included in the aforementioned SPS and information related to the parameter, and transmitting information related to an operation of the video reception apparatus in an upper layer. By using the descriptor of the PSI for the transfer characteristics as well, the video reception apparatus can more easily determine a method of controlling the video display. Since the PSI is generally inserted into a multiplexed stream at a constant cycle, the PSI is not synchronized with frames of a video signal. Note that according to the MPEG-H MPEG media transport (MMT) standard, a structure similar to the PSI is defined as MMT-SI.

The transfer characteristics are defined by, for example, ITU-R BT.2020 (hereinafter, BT.2020), ARIB STD-B67 (hereinafter, STD-B67), and SMPTE ST2084 (hereinafter, ST2084). STD-B67 and ST2084 can handle a video signal having a luminance ten to a hundred times as high as the conventional BT.2020, known as the high dynamic range (HDR). In contrast to the HDR, the dynamic range of the conventional BT.2020 etc., is called the standard dynamic range (SDR).

The TV broadcast compatible with the HDR may include both HDR programs and commercials and SDR programs and commercials. Accordingly, the video reception apparatus needs to operate while switching the control on the display, depending on whether the program/commercial is the HDR or the SDR.

A video reception method according to an aspect of the present disclosure is a video reception method performed by a video reception apparatus including a display. The video reception method includes: receiving a reception signal including video data and transfer characteristics information, the transfer characteristics information being information for specifying, at frame accuracy, a transfer function corresponding to a luminance dynamic range of the video data; and displaying the video data while controlling a luminance dynamic range of the display at frame accuracy according to the transfer characteristics information.

This makes it possible to control the luminance dynamic range of the display at frame accuracy, and thus more appropriate video can be displayed.

For example, the video reception method may further include: demultiplexing the reception signal multiplexed from a video signal and an audio signal; and obtaining the video data and the transfer characteristics information by decoding the video signal obtained by the demultiplexing.

For example, the transfer characteristics information may be included in control information that is included in the video signal, the control information being provided on a sequence-by-sequence basis.

For example, the transfer characteristics information may be information for specifying, at frame accuracy, a first transfer function corresponding to a first luminance dynamic range or a second transfer function corresponding to a second luminance dynamic range wider than the first luminance dynamic range. In the displaying of the video data, the luminance dynamic range of the display may be switched between the first luminance dynamic range and the second luminance dynamic range.

For example, the video reception method may further include: determining whether the video data is correctly obtained in the receiving of the reception signal. In the displaying of the video data, the first luminance dynamic range may be set as the luminance dynamic range of the display when it is determined that the video data is not correctly obtained.

This makes it possible to inhibit excessively bright video from being displayed when an error occurs.

For example, in the determining, whether an intra coded frame is correctly decoded may be determined.

A video transmission method according to an aspect of the present disclosure includes: generating a transmission signal including video data and transfer characteristics information, the transfer characteristics information being information for specifying, at frame accuracy, a transfer function corresponding to a luminance dynamic range of the video data; and transmitting the transmission signal.

With this, the video reception apparatus that receives the signal generated using the video transmission method can control the luminance dynamic range of the display at frame accuracy, and thus can display more appropriate video.

For example, the generating of the transmission signal may include: generating a video signal by coding the video data and the transfer characteristics information; and generating the transmission signal by multiplexing the video signal generated and an audio signal.

For example, the transfer characteristics information may be included in control information that is included in the video signal, the control information being provided on a sequence-by-sequence basis.

For example, the transfer characteristics information may be information for specifying, at frame accuracy, a first transfer function corresponding to a first luminance dynamic range or a second transfer function corresponding to a second luminance dynamic range wider than the first luminance dynamic range.

A video reception apparatus according to an aspect of the present disclosure is a video reception apparatus including: a receiver that receives a reception signal including video data and transfer characteristics information, the transfer characteristics information being information for specifying, at frame accuracy, a transfer function corresponding to a luminance dynamic range of the video data; and a display that displays the video data while controlling a luminance dynamic range of the display at frame accuracy according to the transfer characteristics information.

With this, the video reception apparatus can control the luminance dynamic range of the display at frame accuracy, and thus can display more appropriate video.

A video transmission apparatus according to an aspect of the present disclosure is a video transmission apparatus including: a generator that generates a transmission signal including video data and transfer characteristics information, the transfer characteristics information being information for specifying, at frame accuracy, a transfer function corresponding to a luminance dynamic range of the video data; and a transmitter that transmits the transmission signal.

With this, the video reception apparatus that receives the signal generated by the video transmission apparatus can control the luminance dynamic range of the display at frame accuracy, and thus can display more appropriate video.

Hereinafter, embodiments will be specifically described with reference to the drawings.

Note that each of the embodiments described below illustrates a specific example of the present disclosure. The numerical values, shapes, materials, structural elements, the arrangement and connection of the structural elements, steps, the processing order of the steps, etc., illustrated in the embodiments below are mere examples, and are therefore not intended to limit the present disclosure. Furthermore, among the structural elements in the following embodiments, structural elements not recited in any one of the independent claims representing the most generic concepts are described as arbitrary structural elements.

Embodiment 1

A video reception apparatus according to the present embodiment controls a luminance dynamic range of a display at frame accuracy, using transfer characteristics information indicating transfer characteristics at frame accuracy. By doing so, the video reception apparatus can display more appropriate video.

First, a configuration of the video reception apparatus according to the present embodiment will be described. FIG. 1 is a block diagram of video reception apparatus 100 according to the present embodiment. Video reception apparatus 100 is a TV, for example, and receives reception signal 111 transmitted via broadcast waves and displays video based on reception signal 111 received. Video reception apparatus 100 includes receiver 101, demultiplexer 102, video decoder 103, display controller 104, and display 105.

Receiver 101 receives reception signal 111. Reception signal 111 is a system stream multiplexed from a video signal and an audio signal.

Demultiplexer 102 generates video signal 112 that is a video stream, by demultiplexing (system decoding) reception signal 111. Furthermore, demultiplexer 102 outputs, as first transfer characteristics information 113, transfer characteristics obtained from, for example, a descriptor included in reception signal 111. That is to say, first transfer characteristics information 113 is included in a multiplexing layer.

Video decoder 103 generates video data 114 by decoding video signal 112. Furthermore, video decoder 103 outputs, as second transfer characteristics information 115, transfer characteristics obtained from the SPS. That is to say, second transfer characteristics information 115 is included in a video coding layer.

Second transfer characteristics information 115 is information for specifying a transfer function (OETF or EOTF) at frame accuracy supporting a luminance dynamic range of video data 114. For example, second transfer characteristics information 115 is information for specifying, at frame accuracy, a first transfer function corresponding to a first luminance dynamic range (SDR) or a second transfer function corresponding to a second luminance dynamic range (HDR) wider than the first luminance dynamic range. That is to say, second transfer characteristics information 115 indicates whether video data 114 is SDR video data or HDR video data. Moreover, when there is more than one method for the HDR, second transfer characteristics information 115 may indicate the method of the HDR. That is to say, second transfer characteristics information 115 indicates the luminance dynamic range of video data 114. For example, second transfer characteristics information 115 indicates one of a plurality of predetermined luminance dynamic ranges.

The SPS is control information included in video signal 112. Here, the control information is provided on a sequence-by-sequence basis (on a plurality of frames-by-a plurality of frames basis).

Display controller 104 generates control information 116 for controlling display 105, according to first transfer characteristics information 113 and second transfer characteristics information 115.

Display 105 displays video data 114 while controlling the luminance dynamic range at frame accuracy according to control information 116 (that is, first transfer characteristics information 113 and second transfer characteristics information 115). Display 105 includes video characteristics converter 106 and display device 107.

Video characteristics converter 106 generates input signal 117 by converting video data 114 according to control information 116. Specifically, video characteristics converter 106 converts video data 114 into input signal 117 using a transfer function indicated in first transfer characteristics information 113 or second transfer characteristics information 115.

Display device 107 is, for example, a liquid crystal panel, and changes the luminance dynamic range of video displayed, according to control information 116. For example, when display device 107 is a liquid crystal panel, display device 107 changes the maximum luminance of a backlight.

Next, an operation of video reception apparatus 100 will be described. Note that although FIG. 1 illustrates a configuration in which both first transfer characteristics information 113 and second transfer characteristics information 115 are used, it is only necessary that at least second transfer characteristics information 115 is used. Hereinafter, control performed using second transfer characteristics information 115 will be described in detail.

Figure 2:
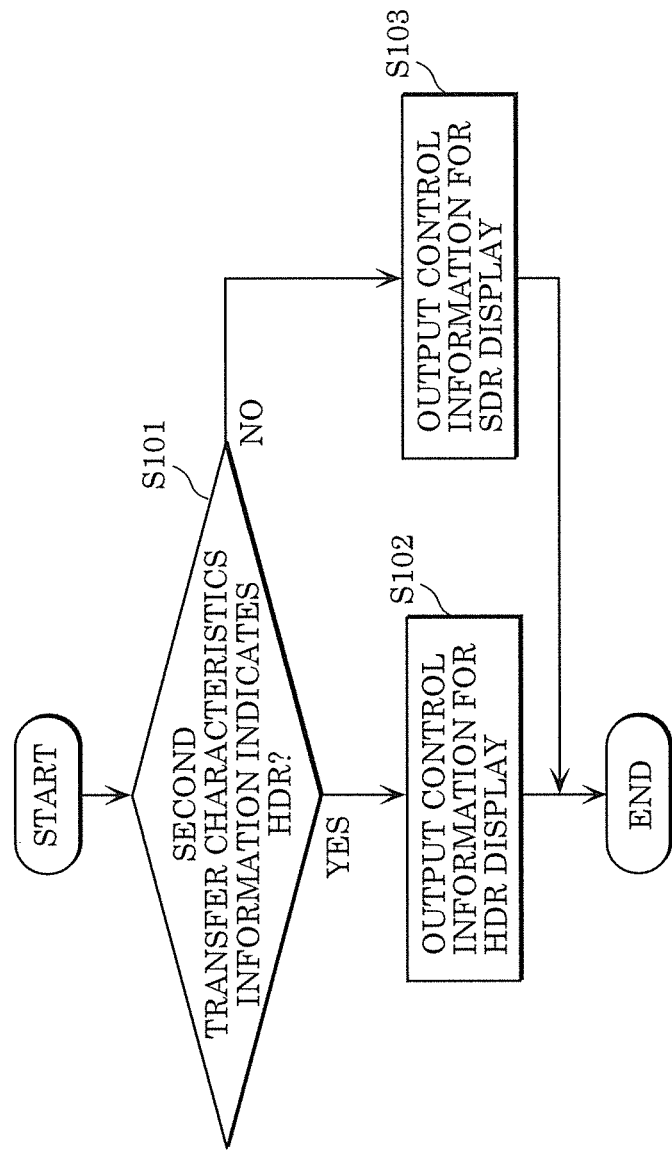
FIG. 2 is a flow chart of processing performed by a display controller according to Embodiment 1.

FIG. 2 is a flow chart of display control processing performed by display controller 104. Note that the processing illustrated in FIG. 2 is performed on a frame-by-frame basis or every time second transfer characteristics information 115 is changed.

First, display controller 104 determines which one of the SDR and the HDR is indicated by second transfer characteristics information 115 (S101).

When the HDR is indicated by second transfer characteristics information 115 (YES in S101), display controller 104 outputs control information 116 for HDR display (S102). With this, display 105 displays video in a luminance dynamic range corresponding to the HDR.

On the other hand, when the SDR is indicated by second transfer characteristics information 115 (NO in S101), display controller 104 outputs control information 116 for SDR display (S103). With this, display 105 displays video in a luminance dynamic range corresponding to the SDR.

In such a manner, by switching control information 116 according to second transfer characteristics information 115 notified of at frame accuracy, it is possible to synchronize the switching of the transfer characteristics and the control on display 105.

Note that when there are a plurality of HDR methods (for example, STD-B67 and ST2084), control information 116 for HDR display may include identification information identifying an HDR method. This allows display 105 to display video in a luminance dynamic range of the corresponding method.

Figure 3:
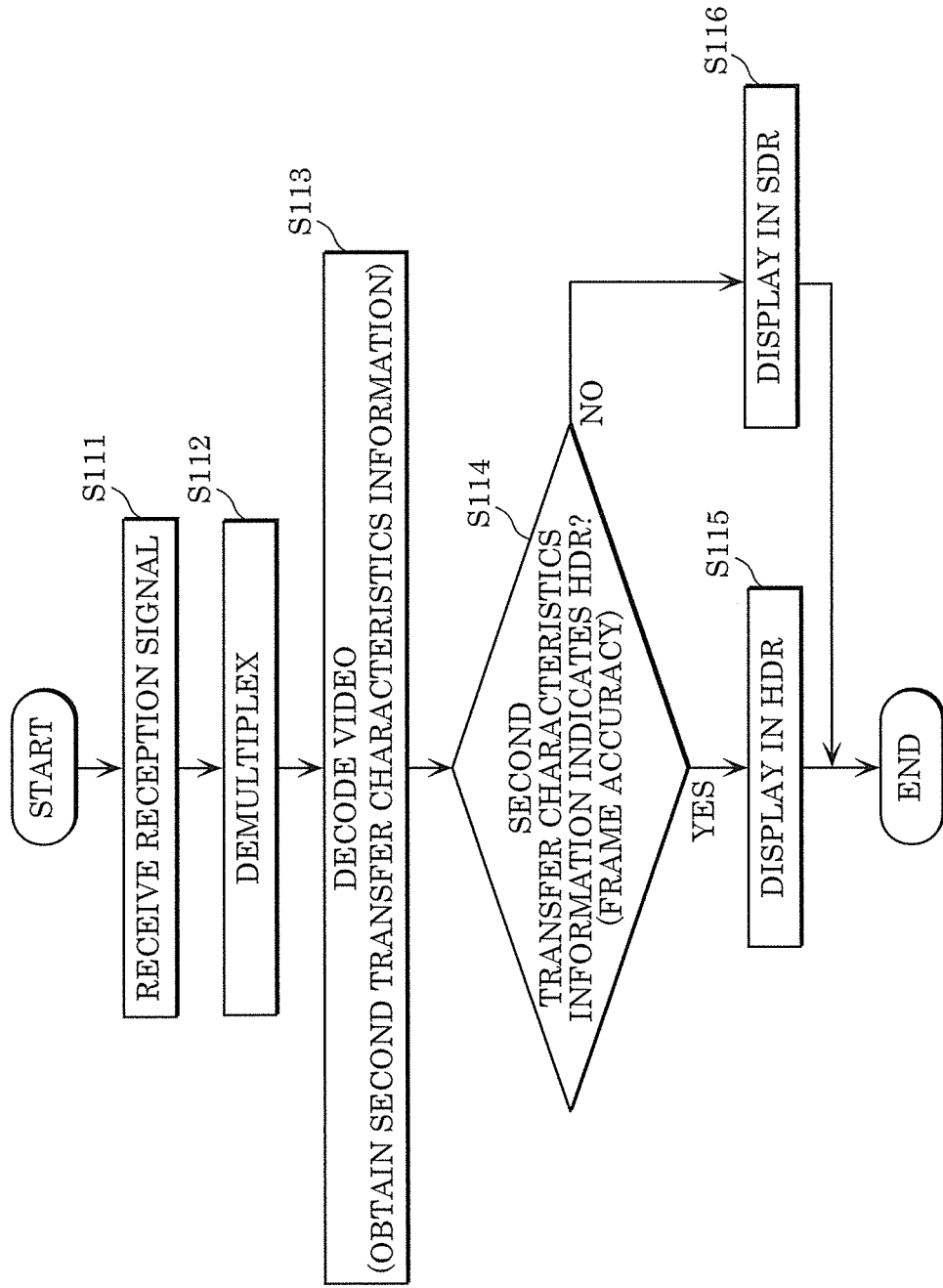
FIG. 3 is a flow chart of video reception processing according to Embodiment 1.

FIG. 3 is a flow chart of video reception processing performed by video reception apparatus 100. First, receiver 101 receives reception signal 111 (S111). Next, demultiplexer 102 generates video signal 112 by demultiplexing reception signal 111 (S112). Next, video decoder 103 generates video data 114 and obtains second transfer characteristics information 115 by decoding video signal 112 (S113).

Next, display controller 104 controls the luminance dynamic range of display 105 according to second transfer characteristics information 115. Specifically, display controller 104 determines, for each frame, at frame accuracy, whether the frame is an HDR frame or an SDR frame, based on second transfer characteristics information 115 (S114). When the frame is an HDR frame (YES in S114), display 105 displays video in the luminance dynamic range of the HDR (S115). When the frame is an SDR frame (NO in S114), display 105 displays video in the luminance dynamic range of the SDR (S116).

Figure 4:
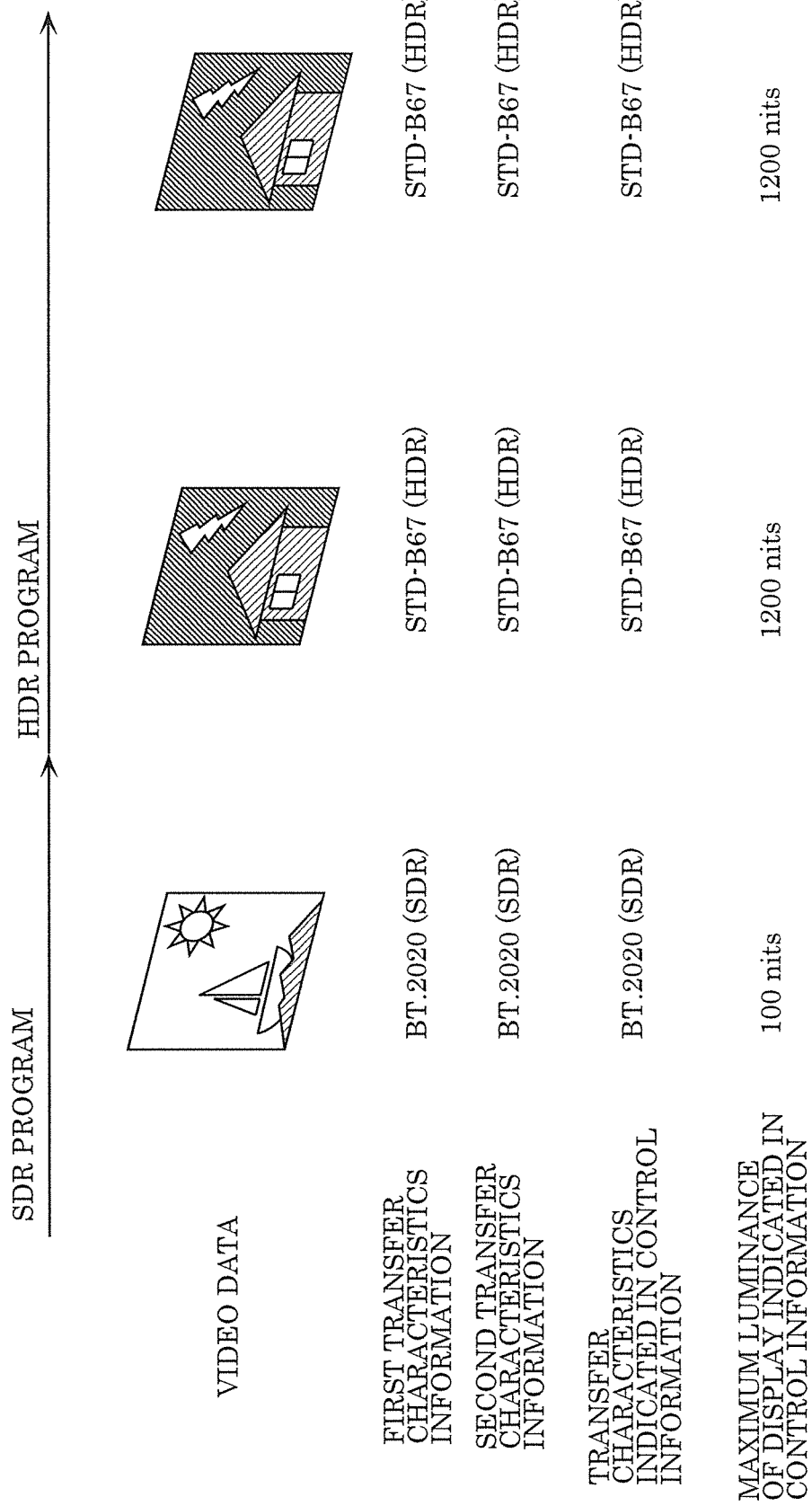
FIG. 4 illustrates an operation performed when there is a change in transfer characteristics according to Embodiment 1.
Figure 5:
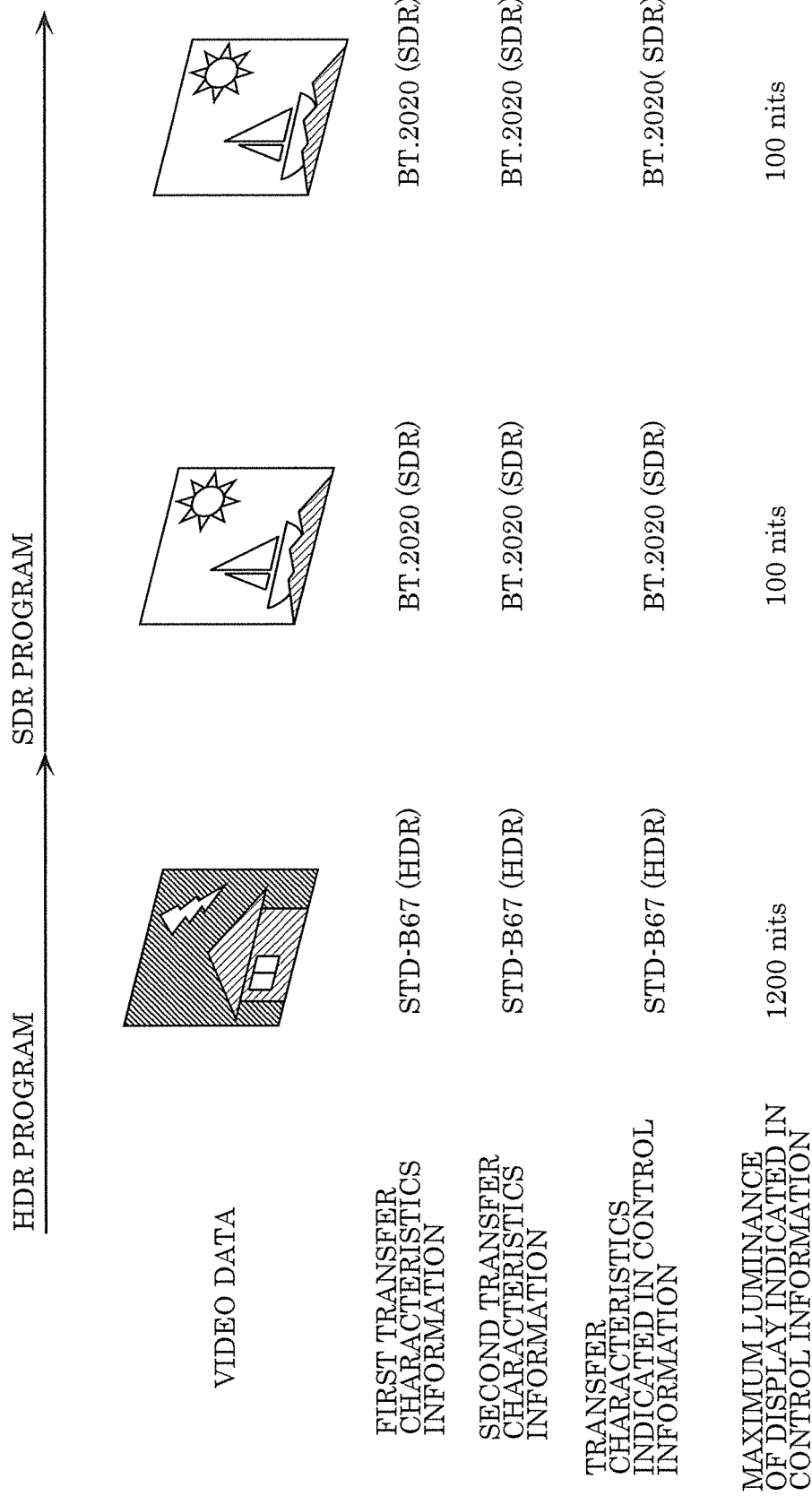
FIG. 5 illustrates an operation performed when there is a change in transfer characteristics according to Embodiment 1.

FIG. 4 illustrates switching from an SDR program to an HDR program. FIG. 5 illustrates switching from an HDR program to an SDR program. As illustrated in FIG. 4 and FIG. 5, the above processing enables appropriate switching between the SDR and the HDR at frame accuracy.

Figure 6:
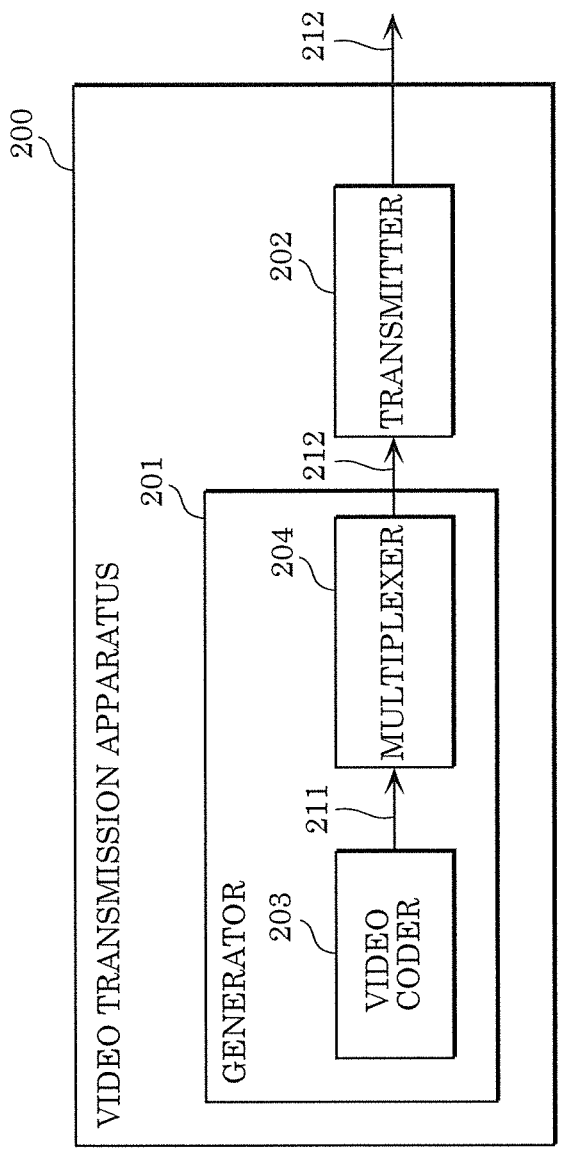
FIG. 6 is a block diagram of a video transmission apparatus according to Embodiment 1.

Hereinafter, video transmission apparatus 200 that generates transmission signal 212 corresponding to aforementioned reception signal 111 will be described. FIG. 6 is a block diagram of video transmission apparatus 200 according to the present embodiment. Video transmission apparatus 200 illustrated in FIG. 6 includes generator 201 and transmitter 202.

Generator 201 generates transmission signal 212 including video data and second transfer characteristics information that is information for specifying, at frame accuracy, a transfer function corresponding to the luminance dynamic range of the video data. Generator 201 includes video coder 203 and multiplexer 204.

Figure 7:
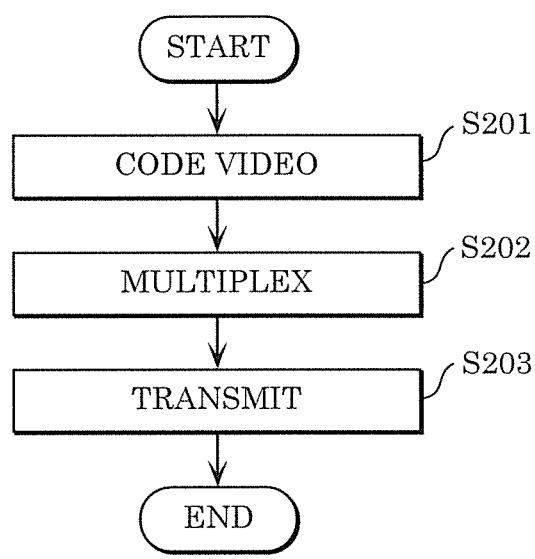
FIG. 7 illustrates a flow chart of video transmission processing according to Embodiment 1.

FIG. 7 is a flow chart of video transmission processing performed by video transmission apparatus 200. First, video coder 203 generates video signal 211 by coding video data and second transfer characteristics information (S201). The second transfer characteristics information corresponds to second transfer characteristics information 115 described above, and is information for specifying, at frame accuracy, the first transfer function corresponding to the first luminance dynamic range (for example, the SDR) or the second transfer function corresponding to the second luminance dynamic range (for example, the HDR) wider than the first luminance dynamic range. The second transfer characteristics information is stored in the SPS included in video signal 211.

Next, multiplexer 204 generates transmission signal 212 by multiplexing coded video signal 211 and an audio signal (S202). Next, transmitter 202 transmits transmission signal 212 generated (S203).

With the above processing, video transmission apparatus 200 generates transmission signal 212 including the second transfer characteristics information for specifying a transfer function at frame accuracy. With this, the video reception apparatus that receives transmission signal 212 can control the luminance dynamic range of the display at frame accuracy, and thus can display more appropriate video.

Embodiment 2

Figure 8:
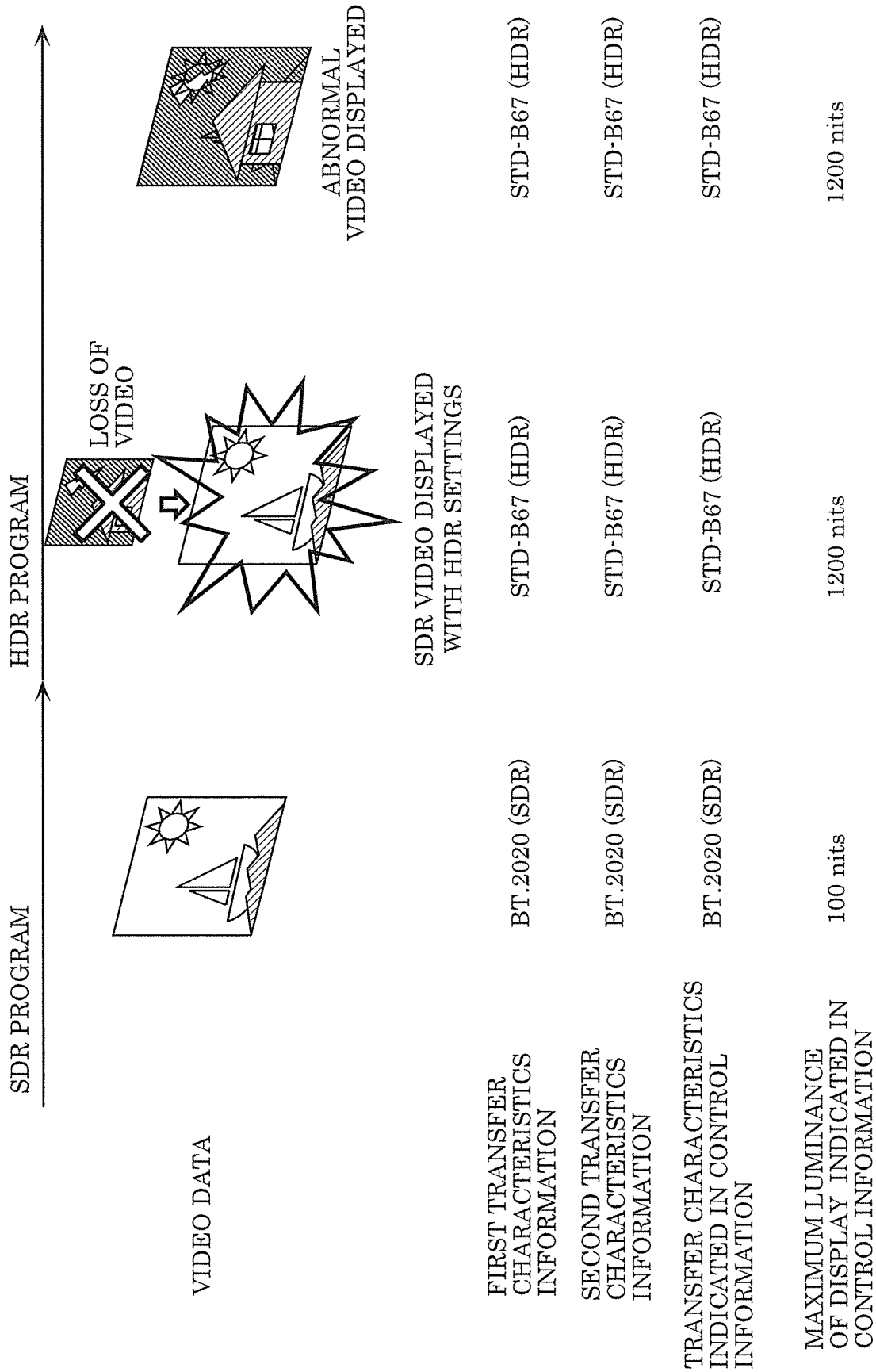
FIG. 8 illustrates an abnormal operation performed when there is a change in transfer characteristics according to Embodiment 2.

With the TV broadcast, an error may occur due to the radio wave condition of terrestrial waves, a satellite, etc. FIG. 8 illustrates the case of a reception error caused by radio disturbance, for example. FIG. 8 illustrates the case where, when switching from the SDR to the HDR, radio disturbance or the like occurs after the video reception apparatus obtains second transfer characteristics information 115 included in the SPS, and, as a result, a loss of a video stream occurs, causing inability to obtain the initial frame of the HDR program. In this case, video decoder 103 continues to display an immediately preceding frame for error concealment. In other words, the frame of the SDR program is repeatedly displayed.

In this case, a subsequent frame refers to this frame, and thus abnormal video mixed with video of a past program is displayed as subsequent video.

Moreover, immediately after the switching from the SDR to the HDR, the luminance dynamic range of the display is set to the HDR, causing the frame of the SDR program to be displayed in the luminance dynamic range of the HDR. This results in a problem of displaying video having a luminance higher than intended.

Figure 9:
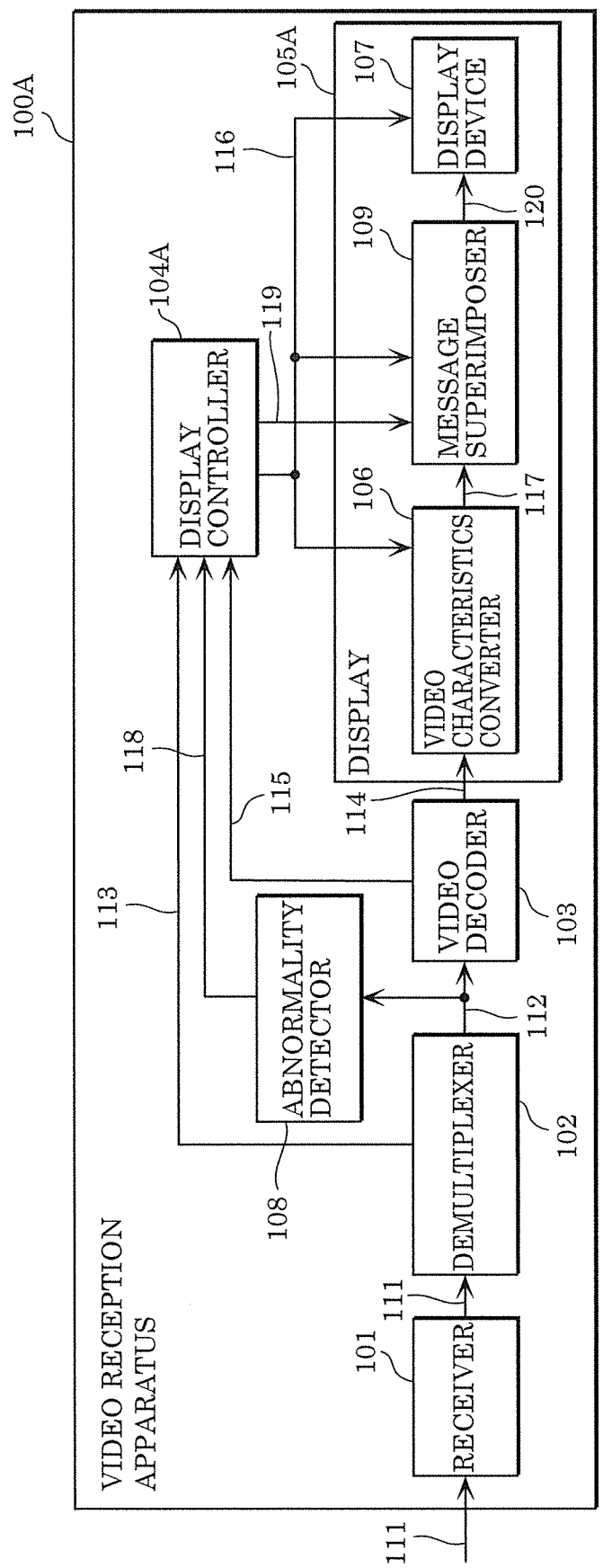
FIG. 9 is a block diagram of a video reception apparatus according to Embodiment 2.

The present embodiment describes a video reception apparatus that addresses this problem. FIG. 9 is a block diagram of video reception apparatus 100A according to the present embodiment. Video reception apparatus 100A illustrated in FIG. 9 includes, in addition to the elements included in video reception apparatus 100 illustrated in FIG. 1, abnormality detector 108 and message superimposer 109 included in display 105A. Moreover, display controller 104A has an additional function.

Abnormality detector 108 determines whether video data 114 (video signal 112) is correctly obtained. Specifically, abnormality detector 108 detects a packet loss based on the sequence number of each packet, and obtains the starting position of frame data by analyzing the payload of each packet, so as to determine whether all the frame data is obtained (normal) or only a part of the frame data is obtained (abnormal). Furthermore, abnormality detector 108 outputs abnormality notifying information 118 indicating the determination result to display controller 104A. That is to say, display controller 104A is notified that an abnormal condition has occurred, or is notified of information for specifying an abnormal frame.

Display controller 104A generates control information 116 and message 119 according to abnormality notifying information 118 in addition to first transfer characteristics information 113 and second transfer characteristics information 115. Specifically, when there is an abnormality, display controller 104A generates message 119 indicating that there is an abnormality, and generates control information 116 for SDR display.

Message superimposer 109 generates input signal 120 by superimposing message 119 on video data (input signal 117) according to control information 116 and message 119, and outputs generated input signal 120 to display device 107. With this, a message such as "Error has occurred" is displayed on display device 107, notifying the viewer that it is not a failure of the apparatus.

Figure 10:
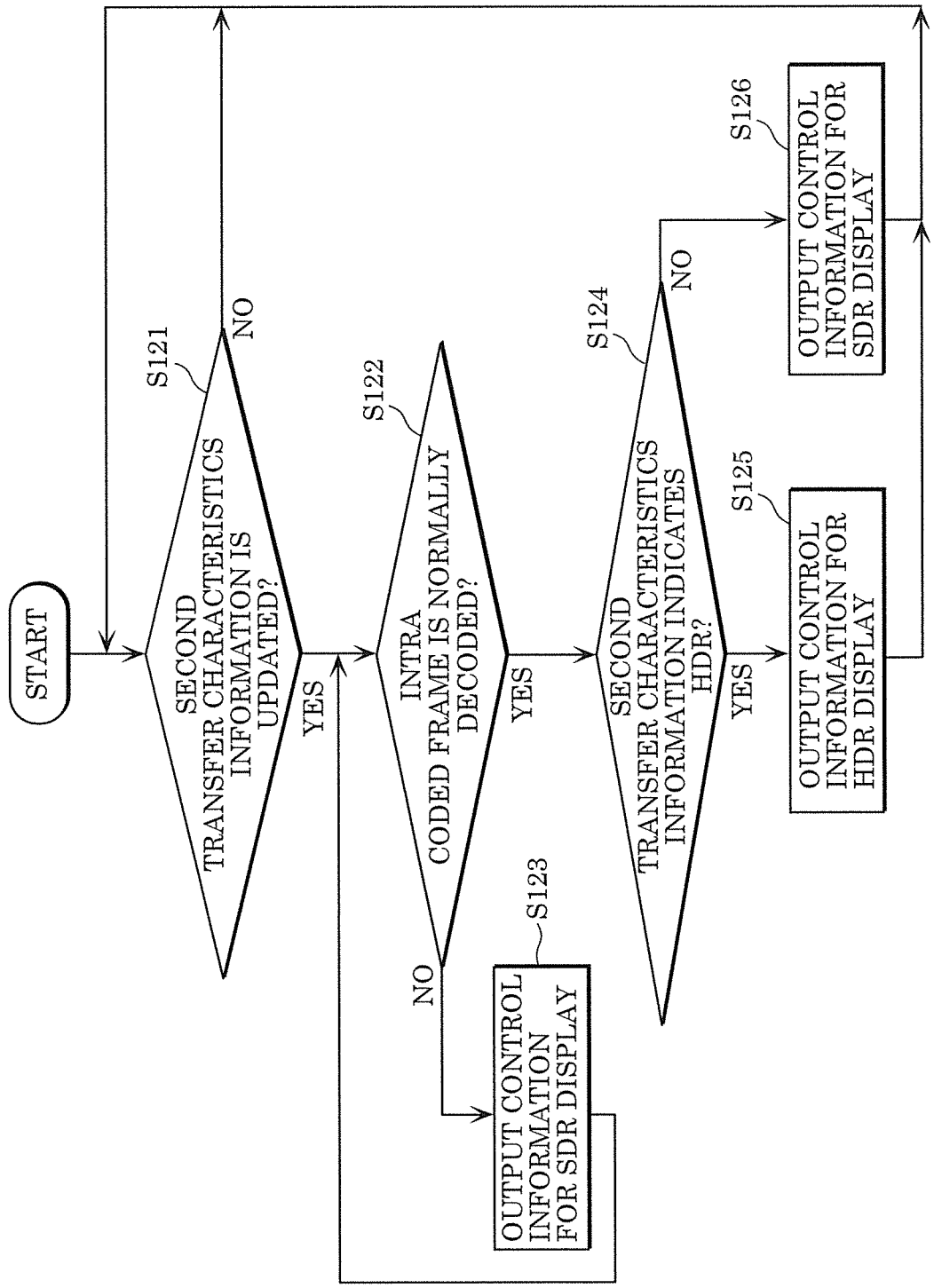
FIG. 10 is a flow chart of processing performed by a display controller according to Embodiment 2.

FIG. 10 is a flow chart of display control processing performed by display controller 104A. First, display controller 104A determines whether second transfer characteristics information 115 is updated (S121). When second transfer characteristics information 115 is updated (YES in S121), display controller 104A starts determination regarding the switching of the display control.

First, display controller 104A determines whether video data is correctly obtained. Specifically, display controller 104A determines whether an intra coded frame is normally decoded, based on abnormality notifying information 118 (S122). When the intra coded frame is not normally decoded (NO in S122), display controller 104A outputs control information 116 for SDR display (S123). With this, display 105 displays video in a luminance dynamic range corresponding to the SDR. That is to say, when determining that the video data is not correctly obtained, display controller 104A sets the SDR (the first luminance dynamic range) as the luminance dynamic range of display 105.

If an error occurs when switching from one luminance dynamic range to another, a frame displayed may include pixels of a frame displayed before the switch. In contrast, according to the present embodiment, in such a case, setting the display control for SDR display as the display control makes it possible to inhibit a frame of the SDR program from being displayed with the HDR high luminance settings.

When an intra coded frame that guarantees interrupt playback, such as IDR or CRA of HEVC, is normally decoded (YES in S122), the display control is switched in the same manner as in Embodiment 1. That is to say, display controller 104A determines which one of the SDR and the HDR is indicated by updated second transfer characteristics information 115 (S124). When the HDR is indicated by second transfer characteristics information 115 (YES in S124), display controller 104A outputs control information 116 for HDR display (S125). On the other hand, when the SDR is indicated by second transfer characteristics information 115 (NO in S124), display controller 104A outputs control information 116 for SDR display (S126).

In such a manner, video reception apparatus 100A according to the present embodiment can inhibit excessively bright video from being displayed when an error occurs, by displaying video in the luminance dynamic range of the SDR when the error occurs.

Hereinbefore, the video reception apparatus and the video transmission apparatus according to embodiments of the present disclosure have been described; however, the present disclosure is not limited to these embodiments.

Moreover, each of processing members included in the video reception apparatus and the video transmission apparatus according to the above embodiments are typically implemented as LSI which is an integrated circuit. These may be implemented in a single chip individually, or in a single chip that includes some or all of them.

Moreover, the method of circuit integration is not limited to LSI. Integration may be implemented with a specialized circuit or a general purpose processor. It is also acceptable to use: a field programmable gate array (FPGA) that is programmable after the LSI is manufactured; and a reconfigurable processor that allows reconfiguration of the connections and settings of the inner circuit cells of the LSI circuit.

Further, in each embodiment described above, each structural element may be implemented by dedicated hardware or by execution of a software program appropriate for the structural element. Each structural element may also be implemented by reading and execution, by a program executing unit such as a central processing unit (CPU) or a processor, of a software program recorded on a recording medium such as a hard disk or semiconductor memory.

Furthermore, the present disclosure may be implemented as a video reception method performed by a video reception apparatus or as a video transmission method performed by a video transmission apparatus.

The division of the functional blocks in the block diagrams is a mere example. A plurality of functional blocks may be implemented as one functional block, or one functional block may be divided into a plurality of blocks, or a part of the functions may be transferred to another functional block. Moreover, the functions of a plurality of functional blocks having similar functions may be performed by single hardware or software in parallel or by time division.

Furthermore, since the processing order of the steps in each flow chart is one example given for specifically describing the present disclosure, other processing orders may be adopted. In addition, a part of the steps may be performed simultaneously (in parallel) with another step.

Hereinbefore, a video reception apparatus and a video transmission apparatus according to one or more aspects have been described based on embodiments; however, the present disclosure is not limited to these embodiments. Various modifications to these embodiments that are conceivable to those skilled in the art, as well as embodiments resulting from combinations of structural elements of different embodiments may be included within the scope of one or more aspects, as long as such modifications and embodiments do not depart from the essence of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a video reception apparatus such as a TV, and a video transmission apparatus.

What is claimed is:

1. A video reception method performed by a video reception apparatus including a display, the video reception method comprising:
   receiving a reception signal including video data and transfer characteristics information, the transfer characteristics information being information for specifying, on a frame-by-frame basis, a transfer function corresponding to a luminance dynamic range of the video data; and
   displaying the video data while controlling a luminance dynamic range of the display on the frame-by-frame basis using the transfer function indicated in the transfer characteristics information,
   wherein the transfer characteristics information is information for specifying, on the frame-by-frame basis, a first transfer function corresponding to a first luminance dynamic range or a second transfer function corresponding to a second luminance dynamic range wider than the first luminance dynamic range,
   in the displaying of the video data, the luminance dynamic range of the display is switched between the first luminance dynamic range and the second luminance dynamic range,
   the video reception method further comprising determining whether the video data is correctly obtained in the receiving of the reception signal, and
   in the displaying of the video data, the first luminance dynamic range is set as the luminance dynamic range of the display when it is determined that the video data is not correctly obtained.

2. The video reception method according to claim 1, further comprising:
   demultiplexing the reception signal multiplexed from a video signal and an audio signal; and
   obtaining the video data and the transfer characteristics information by decoding the video signal obtained by the demultiplexing.

3. The video reception method according to claim 2, wherein
   the transfer characteristics information is included in control information that is included in the video signal, the control information being provided on a sequence-by-sequence basis.

4. The video reception method according to claim 1, wherein in the determining, whether an intra coded frame is correctly decoded is determined.

5. A video reception apparatus, comprising:
   a processor; and a non-transitory memory having stored therein executable instructions, which when executed, cause the processor to perform:
   receiving, using a receiver, a reception signal including video data and transfer characteristics information, the transfer characteristics information being information for specifying, on a frame-by-frame basis, a transfer function corresponding to a luminance dynamic range of the video data; and
   displaying, using a display, the video data while controlling a luminance dynamic range of the display on the frame-by-frame basis using the transfer function indicated in the transfer characteristics information,
wherein the transfer characteristics information is information for specifying, on the frame-by-frame basis, a first transfer function corresponding to a first luminance dynamic range or a second transfer function corresponding to a second luminance dynamic range wider than the first luminance dynamic range,
in the displaying of the video data, the luminance dynamic range of the display is switched between the first luminance dynamic range and the second luminance dynamic range,
the executable instructions, when executed, further cause the processor to perform determining whether the video data is correctly obtained in the receiving of the reception signal, and
in the displaying of the video data, the first luminance dynamic range is set as the luminance dynamic range of the display when it is determined that the video data is not correctly obtained.

6. A video transmission apparatus, comprising:
a processor; and
a non-transitory memory having stored therein executable instructions, which when executed, cause the processor to perform:
   generating a transmission signal including video data and transfer characteristics information, the transfer characteristics information being information for specifying, on a frame-by-frame basis, a transfer function corresponding to a luminance dynamic range of the video data; and
   transmitting, using a transmitter, the transmission signal,
wherein the transfer characteristics information is information for specifying, on the frame-by-frame basis, a first transfer function corresponding to a first luminance dynamic range or a second transfer function corresponding to a second luminance dynamic range wider than the first luminance dynamic range.

7. A video decoder for sequentially decoding frames, comprising:
a receiving circuit configured to receive a video signal including a first frame and control information, the first frame conforming to Standard Dynamic Range (SDR) or High Dynamic Range (HDR); and
a signal processing circuit configured to:
   generate first display data based on the first frame and a first transfer characteristics function that is associated with the first frame, the control information including the first transfer characteristics function;
   determine whether the receiving circuit correctly receives a second frame following the first frame in a time axis;
   generate second display data based on the second frame and a second transfer characteristics function if the receiving circuit is determined to correctly receive the second frame, the control information including the second transfer characteristics function associated with the second frame; and
   generate third display data based on the second frame and a third transfer characteristics function if the receiving circuit is determined not to correctly receive the second frame, the control information including the third transfer characteristics function, and the third transfer characteristics function supporting the SDR.

8. The video decoder according to claim 7, wherein the second frame conforms to the HDR.

9. The video decoder according to claim 7, wherein the signal processing circuit is configured to determine that the receiving circuit does not correctly receive the second frame if a packet loss is detected.

10. The video decoder according to claim 7, wherein the signal processing circuit is configured to determine that the receiving circuit does not correctly receive the second frame if the receiving circuit receives only a part of the second frame.

* * * * *